T. BAKER.
Potato-Digger.
No. 39,108. Patented July 7, 1863.
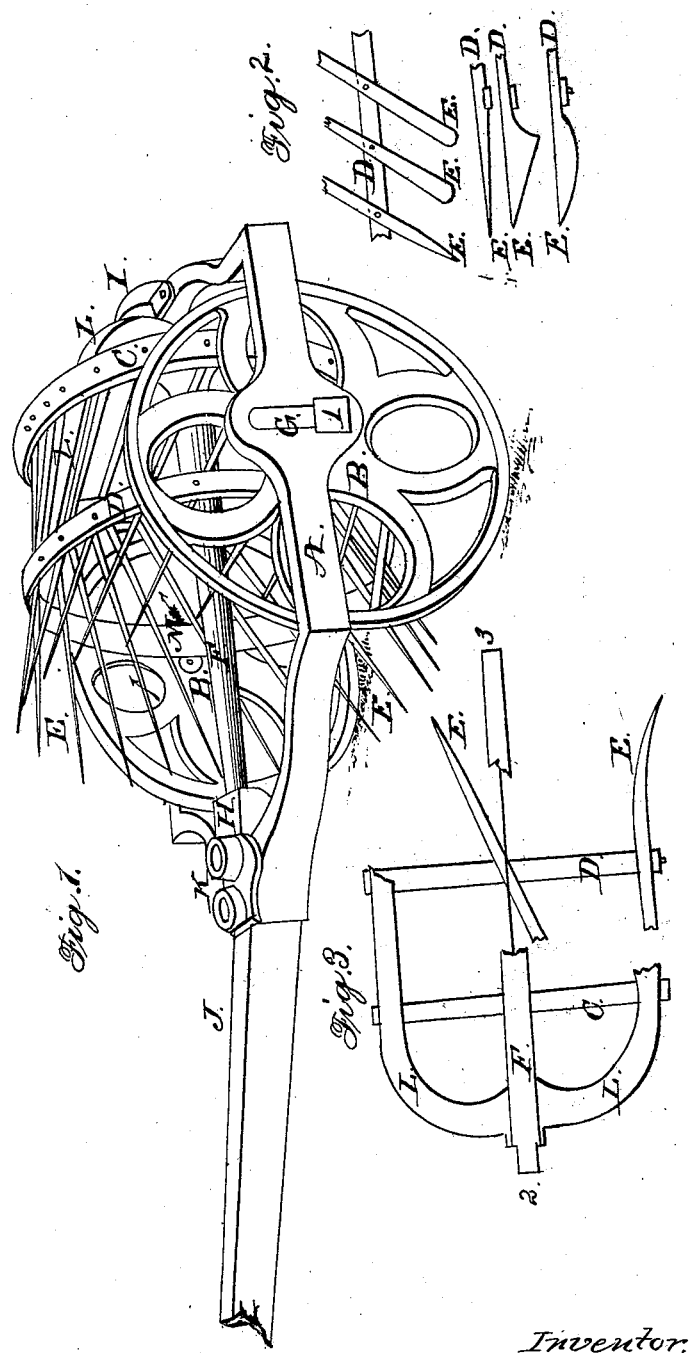
WITNESSES:
Charles Baker
Lewis Lyon
Inventor:
Theodore Baker

UNITED STATES PATENT OFFICE.

THEODORE BAKER, OF STILLWATER, NEW YORK.

IMPROVEMENT IN POTATO-DIGGERS.

Specification forming part of Letters Patent No. 39,108, dated July 7, 1863; antedated July 2, 1862.

*To all whom it may concern:*

Be it known that I, THEODORE BAKER, of the town of Stillwater, in the county of Saratoga and State of New York, have invented a new and Improved Machine for Digging Potatoes; and I do hereby declare that the following is a full, clear, and exact description of the construction and operation of the same, reference being had to the annexed drawings, making a part of this specification, in which—

Figure 1 is a perspective view. Figs. 2 and 3 are views of detached portions, like letters referring to like parts.

A is the frame; B, supporting-wheels; M, digging-cylinder; C D, hoops of the cylinder; E, bars, made flaring from D to their points; L, curved spiral arms extending from hoop D to the rear end of the shaft F; H I, boxes for the journals 2 3 of the shaft F, on which the cylinder rotates. G is a slot for adjusting the depth of the machine by the set-bolt 1. J is the pole, secured by the bolt K to the frame A.

Fig. 2 shows different forms of bars adapted to different soils. Fig. 3 shows a portion of the digging-cylinder, looking down upon it, showing how the hoops C D are supported by the curved arms L, made spiral, so as to carry the potatoes through the cylinder, and curved to allow a space for discharging the potatoes behind the hoop C; also showing how the inclination of the bars will cause the cylinder to revolve as they move forward in the ground; also showing how the bars, by flaring outward, will take up the potatoes and let the separator or hinder part of the cylinder run clear from the ground, so that the earth may sift through and drop beneath the separating-cylinder.

Operation: The team being attached and the machine set at its proper depth, by moving forward the flaring bars enter the ground, taking up the potatoes and a part of the soil about them, and rotate the cylinder, separating the earth from the potatoes, which are carried through by the spiral arms and discharged in a row behind the machine.

The invention consists in an improved shape and arrangement of the bars on the front end of the cylinder, so as to cause the cylinder to revolve, by flaring them outward beyond a line of the separating-cylinder, thereby taking a deeper hold in the earth, by which shape also the separating-cylinder will move clear from the earth beneath and make a more perfect separation of the potatoes and soil.

I am aware that spiral bars have been used, forming a straight cylinder from end to end, either dragging upon the ground its whole length and not separating the potatoes from the soil, or by raising the hinder part and thereby preventing either the potatoes or soil from passing through; but by flaring my bars outward in front all these defects are remedied and a perfect digger and separator is obtained.

The invention also consists in the manner of hanging the cylinder to its shaft behind and beyond the working parts of the same by the curved arms, by which great strength and easy motion is obtained, leaving the cylinder open and clear of obstructions to the passage of the potatoes, vines, and earth.

What I claim as my invention, and desire to secure by Letters Patent, is—

The arrangement of the flaring bars E and the spiral arms L, attached to the shaft F, constructed and operated as and for the purpose described.

THEODORE BAKER.

Witnesses:
JOHN G. LANSING,
JACOB S. LADOW.